(12) United States Patent
    Rupp

(10) Patent No.: US 12,596,179 B2
(45) Date of Patent: Apr. 7, 2026

(54) SENSOR MOUNTING ASSEMBLY IN VEHICLES

(71) Applicant: Honda Motor Co., Ltd., Tokyo (JP)

(72) Inventor: Timothy J. Rupp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 18/455,504

(22) Filed: Aug. 24, 2023

(65) Prior Publication Data

US 2025/0067846 A1      Feb. 27, 2025

(51) Int. Cl.
| | |
|---|---|
| *G01S 7/481* | (2006.01) |
| *B60R 11/04* | (2006.01) |
| *G01S 17/931* | (2020.01) |
| *H04N 23/54* | (2023.01) |
| *B60R 11/00* | (2006.01) |

(52) U.S. Cl.
CPC ............ *G01S 7/4813* (2013.01); *B60R 11/04* (2013.01); *G01S 17/931* (2020.01); *H04N 23/54* (2023.01); *B60R 2011/004* (2013.01); *B60R 2011/0063* (2013.01)

(58) Field of Classification Search
USPC ......................................................... 73/431
See application file for complete search history.

(56) References Cited

U.S. PATENT DOCUMENTS

| | | | | |
|---|---|---|---|---|
| 10,189,506 B2* | 1/2019 | Moore | .................. | G01S 13/931 |
| 2025/0093470 A1* | 3/2025 | Rupp | .................... | G01S 7/4813 |
| 2025/0136021 A1* | 5/2025 | Rupp | ..................... | B60R 11/04 |

FOREIGN PATENT DOCUMENTS

| | | |
|---|---|---|
| CN | 209479559 U | 10/2019 |
| CN | 211969321 U | 11/2020 |
| CN | 212781218 U | 3/2021 |
| CN | 114312589 A | 4/2022 |
| CN | 216269028 U | 4/2022 |
| CN | 114750701 A | 7/2022 |
| CN | 217022384 U | 7/2022 |
| CN | 217112721 U | 8/2022 |
| CN | 217347676 U | 9/2022 |
| CN | 218085331 U | 12/2022 |
| JP | 5672539 B2 | 2/2015 |

* cited by examiner

*Primary Examiner* — Walter L Lindsay, Jr.
*Assistant Examiner* — Warren K Fenwick
(74) *Attorney, Agent, or Firm* — Mark Duell; American Honda Motor Co., Inc.

(57) ABSTRACT

A sensor mounting assembly is provided. The sensor mounting assembly includes a cover coupled to a glass roof of a vehicle. The cover encloses a sensor that is disposed proximate to the glass roof of the vehicle. The sensor mounting assembly further includes a bracket coupled to a roof rail that may be located beneath the glass roof of the vehicle. The bracket is secured to the roof rail from an interior cabin of the vehicle, to hold the sensor proximate to the glass roof of the vehicle.

17 Claims, 5 Drawing Sheets

SENSOR MOUNTING ASSEMBLY IN VEHICLES

BACKGROUND

Vehicles generally have multiple sensors, which may be configured to sense various information based on which several operations of the vehicle are controlled. For example, the vehicle may include vision sensors, such as, one of: a charge coupled device (CCD) sensor, a complementary metal oxide semiconductor (CMOS) sensor, a RADAR sensor, a LiDAR sensor, an infrared sensor, and the like, which may be used to measure surrounding data/images to further control movements of the vehicle. In certain instances, the vision sensors may be located on a roof of the vehicle, to facilitate an optimal field-of-view for the vision sensors. In certain instances, it may be difficult for an operator to perform precise positioning and assembly of the vision sensors on the roof of the vehicle, which may eventually impact ergonomics in an assembly line of the vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a sensor mounting assembly is provided. The sensor mounting assembly may include a cover coupled to a glass roof of a vehicle. The cover may be configured to enclose a sensor that is disposed proximate to the glass roof of the vehicle. The sensor mounting assembly may further include a bracket coupled to a roof rail that may be located beneath the glass roof of the vehicle. The bracket may be configured to be secured to the roof rail from an interior cabin of the vehicle, to hold the sensor proximate to the glass roof of the vehicle.

According to an embodiment of the disclosure, a sensor mounting assembly is disclosed. The sensor mounting assembly may include a cover coupled to a glass roof of a vehicle. The cover may be configured to enclose a sensor that may be disposed proximate to the glass roof of the vehicle. The sensor mounting assembly may further include a bracket coupled to a roof rail that may be located beneath the glass roof of the vehicle and configured to be secured to the roof rail from an interior cabin of the vehicle to hold the sensor proximate to the glass roof of the vehicle. The cover may be pre-assembled with the glass roof to form a first assembled component, and the bracket may be assembled with the roof rail to form a second assembled component. The second assembled component may be coupled with the first assembled component to mount the sensor proximate to the glass roof of the vehicle.

According to another embodiment of the disclosure, a method for forming a sensor assembly is provided. The method may include coupling a cover to a glass roof of a vehicle. The cover may be configured to enclose a sensor that may be disposed proximate to the glass roof of the vehicle. The method may further include securing the sensor to a portion of a bracket. The bracket may be configured to hold the sensor proximate to the glass roof of the vehicle. The method may further include coupling the bracket to a roof rail that may be located beneath the glass roof of the vehicle. The bracket may be configured to be secured to the roof rail from an interior cabin of the vehicle.

Figure 1:
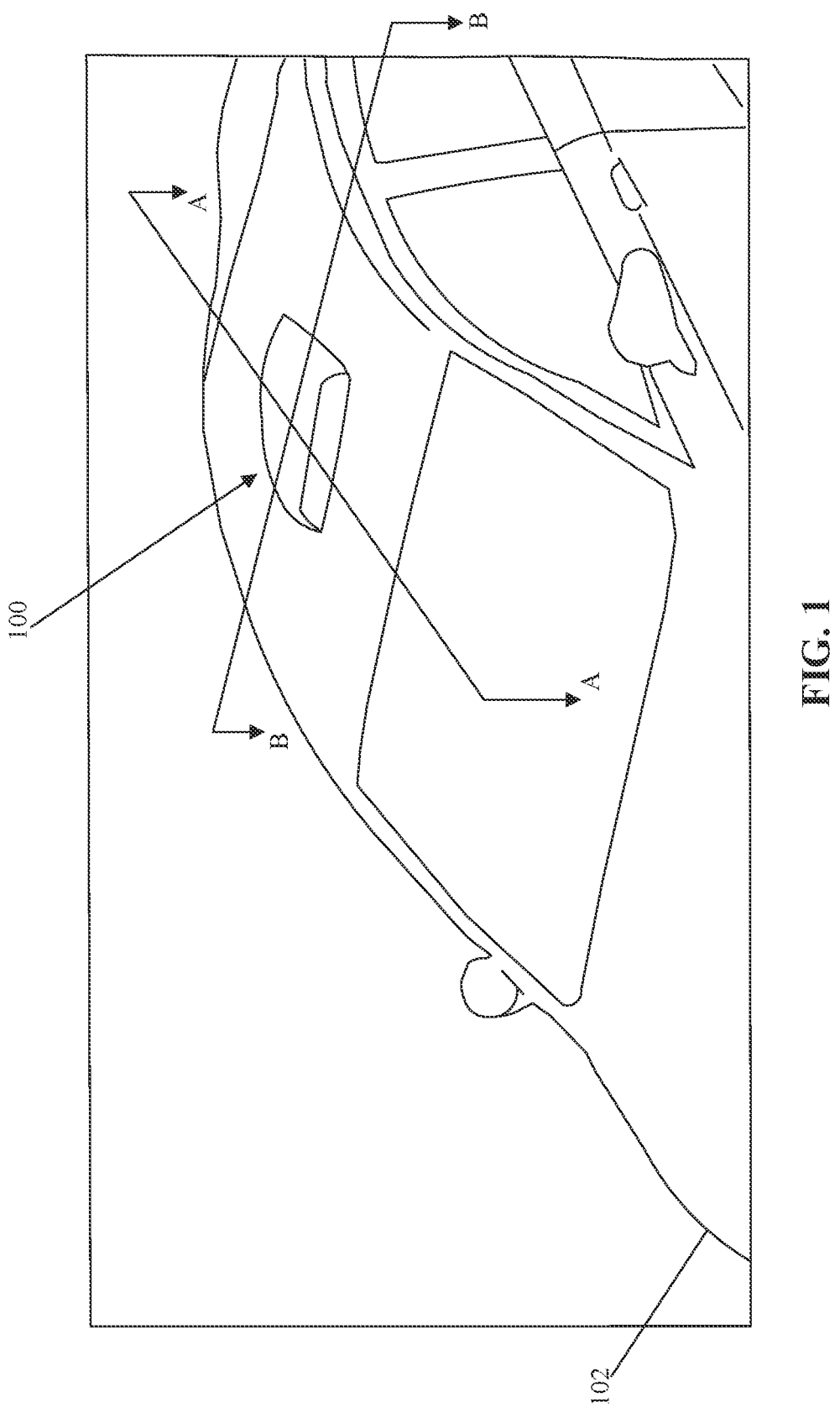
FIG. 1 is a diagram that illustrates an isometric view of a sensor mounting assembly for a vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed sensor mounting assembly. The sensor mounting assembly may include a cover that may be coupled to a glass roof of a vehicle and configured to enclose a sensor that is disposed proximate to the glass roof of the vehicle. In an event of assembly, the sensor is initially disposed proximate to the glass roof and then enclosed by the cover. Hence, it may be easier for an operator to perform precise positioning and assembly of the sensor on the roof of the vehicle, which may eventually improve ergonomics in an assembly line of the vehicle.

The sensor mounting assembly may further include a bracket that may be coupled to a roof rail that may be located beneath the glass roof of the vehicle. The bracket may be configured to be secured to the roof rail from an interior cabin of the vehicle, to hold the sensor proximate to the glass roof of the vehicle. As the bracket and the sensor are configured to be secured to the roof rail from the interior cabin of the vehicle, there may not be a need for the operator to climb on to the roof of the vehicle for positioning and assembling the sensor. Hence, it may be further easier for the operator to perform precise positioning and assembly of the sensor on the roof of the vehicle, which may further improve ergonomics in the assembly line of the vehicle.

Further, it may also be noted that the bracket may be decoupled (for example, unfastened) from the roof rail in a service event (for example, a repair/replacement) of the sensor. Hence, as the sensor may be accessed directly from the interior cabin of the vehicle, there may be a substantial timesaving in the service event of the sensor.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a diagram that illustrates an isometric view of a sensor mounting assembly for a vehicle, in accordance with an embodiment of the disclosure. With reference to FIG. 1, there is shown a sensor mounting assembly 100 for a vehicle 102.

Figure 2:
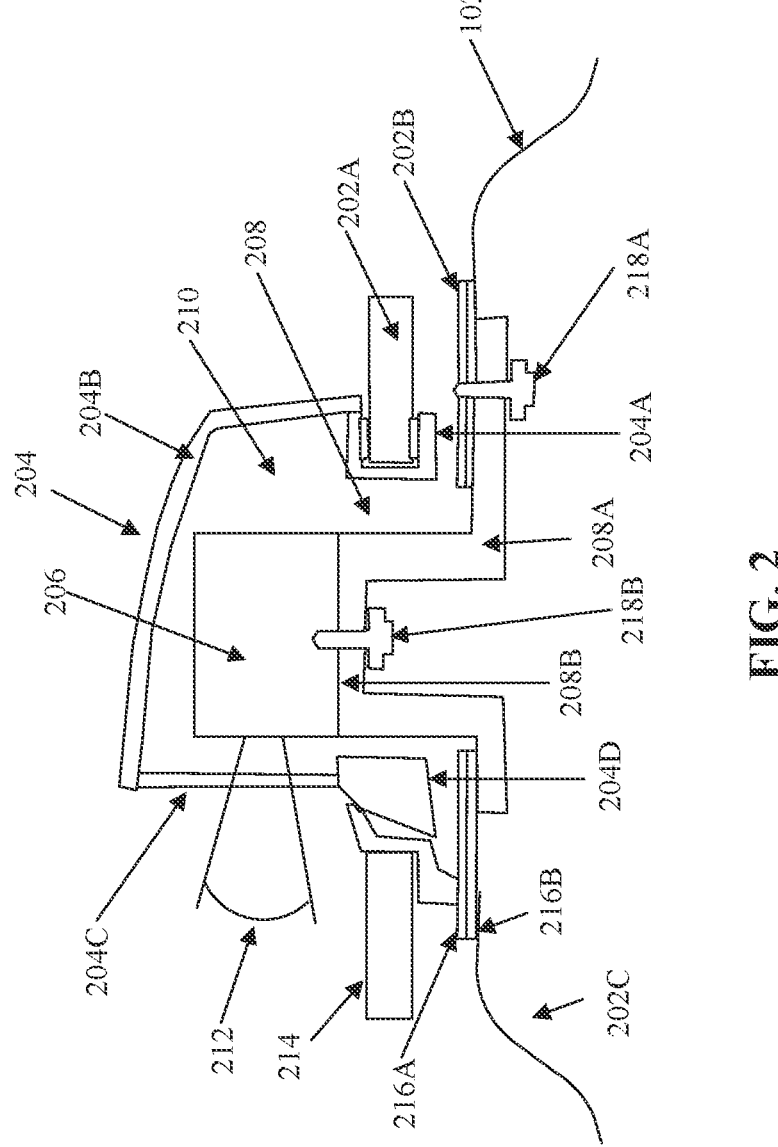
FIG. 2 is a diagram that illustrates a first cross-sectional view of the sensor mounting assembly of FIG. 1, in accordance with an embodiment of the disclosure.
Figure 2:

The sensor mounting assembly 100 has a suitable design, shape, and structure, which may be configured to secure a sensor of the vehicle 102. For example, the sensor mounting assembly 100 may generally include multiple components (as shown in FIG. 2), for example, a cover and a bracket. The cover may be configured to enclose the sensor of the vehicle 102 and the bracket may be configured to hold and secure the sensor of the vehicle 102. Details of such cover and the bracket are further described, for example, in FIG. 2. In an embodiment, the sensor mounting assembly 100 may be located on a top surface of the vehicle 102. In another embodiment, the sensor mounting assembly 100 may be located on a frontal portion of the top surface of the vehicle 102. The sensor mounting assembly 100 may generally have a substantially arcuate profile, to improve aerodynamics of the vehicle 102. However, it may be noted that the substantially arcuate profile is merely an example and the sensor mounting assembly 100 may include any structural profile, for example, a rectangular profile, a square profile, a polygonal profile, and the like. Based on user requirements and structural aspects of the vehicle 102, such structural profile of the sensor mounting assembly 100 may be modified.

Figure 3:
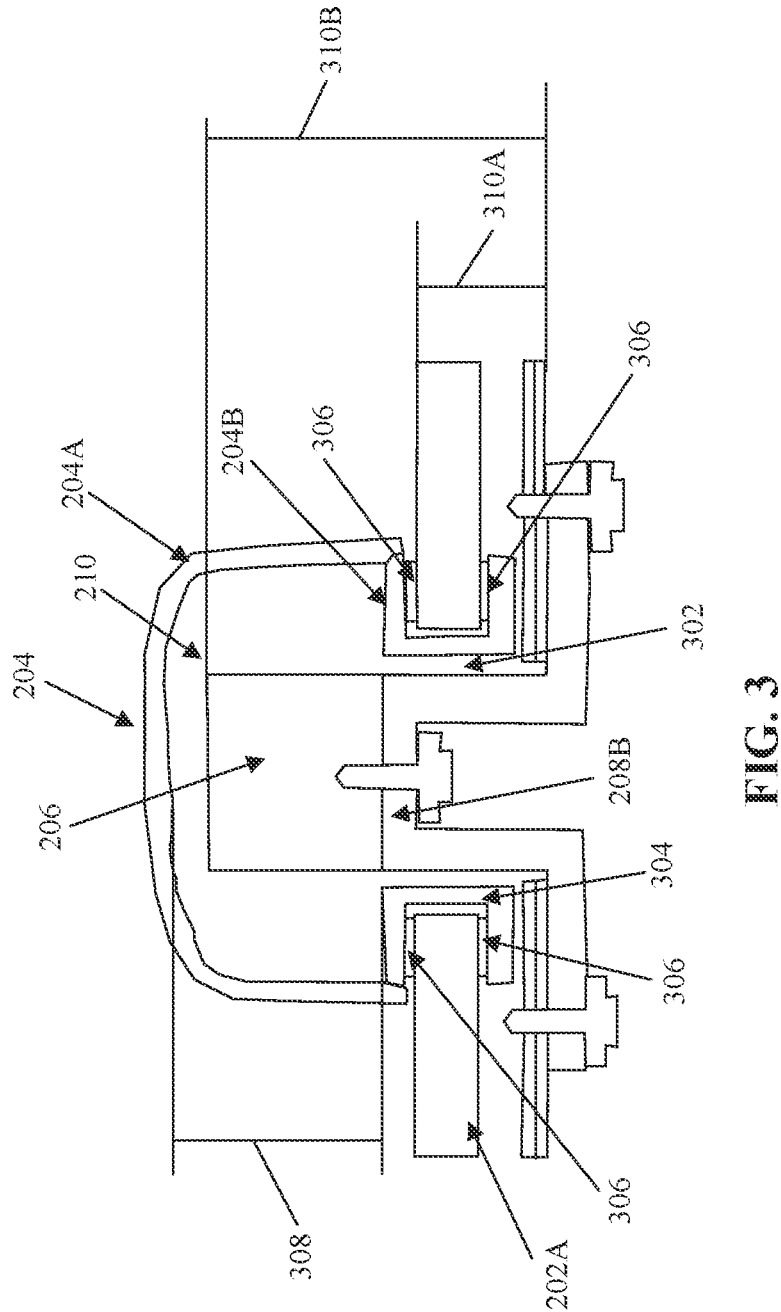
FIG. 3 is a diagram that illustrates a second cross-sectional view of the sensor mounting assembly of FIG. 1, in accordance with an embodiment of the disclosure.
Figure 3:

The vehicle 102 may be a non-autonomous vehicle, a semi-autonomous vehicle, or a fully autonomous vehicle, for example, as defined by National Highway Traffic Safety Administration (NHTSA) or Society of Automotive Engineers (SAE) automation levels. Examples of the vehicle 102 may include, but are not limited to, a single-wheeler vehicle, a two-wheeler vehicle, a three-wheeler vehicle, a four-wheeler vehicle, or a multi-wheeled vehicle. It may be noted here that the vehicle 102 shown as the four-wheeler vehicle in FIG. 1, is merely shown as example. The present disclosure may be also applicable to other types of vehicles, such as, two-wheeler vehicles (for example, a scooter) or three-wheeler vehicles, and the like. The description of other types of the vehicle 102 has been omitted from the disclosure for the sake of brevity. In certain cases, the vehicle 102 may also be a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other individual forms of alternative energy sources, or a combination of alternative energy sources. The sensor mounting assembly 100 and the vehicle 102 of FIG. 1 is illustratively cut along a first section A-A (as shown in FIG. 2) and a second section B-B (as shown in FIG. 3), to describe other components of the sensor mounting assembly 100 and the vehicle 102.

FIG. 2 is a diagram that illustrates a first cross-sectional view of the sensor mounting assembly of FIG. 1, in accordance with an embodiment of the disclosure. FIG. 2 is described in conjunction with elements from FIG. 1. With reference to FIG. 2, there is shown a first cross-sectional view 200 of the sensor mounting assembly 100 and the vehicle 102, which may be sectioned along the first section A-A of FIG. 1.

The vehicle 102 may include a glass roof 202A that may be disposed on a roof (for example, a top surface) of the vehicle 102, a roof rail 202B beneath the glass roof 202A, and an interior cabin 202C to accommodate an occupant or an operator of the vehicle 102.

The glass roof 202A may be a panel that may be fixed to the roof of the vehicle 102. In an embodiment, the glass roof 202A may be a fixed panel that may be fixedly coupled to the roof of the vehicle 102. In another embodiment, the glass roof 202A may be a movable panel that may be moveably coupled to the roof of the vehicle 102. In yet another embodiment, the glass roof 202A may be a fixed panel that further includes a moveable section, such that, the moveable section of the glass roof 202A may be configured to be moveably coupled to the roof of the vehicle 102. The glass roof 202A may be manufactured as a transparent panel or a tinted panel, based on the user preference. In an embodiment, the glass roof 202A is generally supported on the roof rail 202B.

The roof rail 202B may include a plurality of rails which may be secured to the roof of the vehicle 102. In an embodiment, the roof rail 202B may be located beneath the glass roof 202A and configured to secure components of the sensor mounting assembly 100. In another embodiment, the roof rail 202B may also be configured to secure other objects (for example, a cargo) on the roof of the vehicle, so that, there may be increased space in the interior cabin 202C of the vehicle 102.

The interior cabin 202C of the vehicle 102 may be a space in the vehicle, which may be configured to accommodate the occupant or the operator of the vehicle. In certain instances, it may be easier for the operator or the occupant to assemble components of the sensor mounting assembly 100 from the interior cabin 202C than from the roof of the vehicle 102. The operator or the occupant may directly assembly components of the sensor mounting assembly 100 from the interior cabin 202C of the vehicle than climbing on to the vehicle 102 to assemble the sensor mounting assembly 100. For example, in case of a service event of a sensor 206 in the sensor mounting assembly 100, it may be easier for the operator or the occupant to repair components of the sensor mounting assembly 100 from the interior cabin 202C than climbing on to the roof of the vehicle 102. Details of the service event is further explained, for example, in FIG. 4.

Further referring to FIG. 2, the sensor mounting assembly 100 may include a cover 204, a sensor 206 enclosed by the cover 204, and a bracket 208 to secure the sensor 206. The bracket 208 may also be configured to couple with the cover 204 and form a storage cavity 210 for the sensor 206.

The cover 204 may include a suitable design, shape, and structure, which may be configured to enclose the sensor 206. In an example, the cover 204 may form a substantially arcuate enclosure to enclose the sensor 206 on the roof of the vehicle 102. Such substantially arcuate enclosure may allow the sensor 206 to be protected from dust or debris; and detect a surrounding environment without affecting aerodynamics of the vehicle 102. In an embodiment, the cover 204 may integrally have two portions (for example, an end portion 204A and an arcuate portion 204B) to enclose the sensor 206. Such integral structure of the cover 204 may allow the operator to easily transport components of the sensor mounting assembly 100 from one location to another location. Such integral structure of the cover 204 may further allow the operator to perform precise positioning and assembly of the sensor 206 on the roof of the vehicle 102, which may eventually improve ergonomics in an assembly line of the vehicle 102.

In another embodiment, the cover 204 may include more than two integral portions (such as the end portion 204A and the arcuate portion 204B) to enclose the sensor 206. The cover 204 may be generally disposed on the roof of the vehicle 102. In an embodiment, the cover 204 may be secured by the glass roof 202A of the vehicle 102. In another embodiment, the cover 204 may be secured by the roof rail 202B of the vehicle 102. In yet another embodiment, the cover 204 may be secured by a combination of the glass roof 202A and the roof rail 202B of the vehicle 102.

Figure 4:
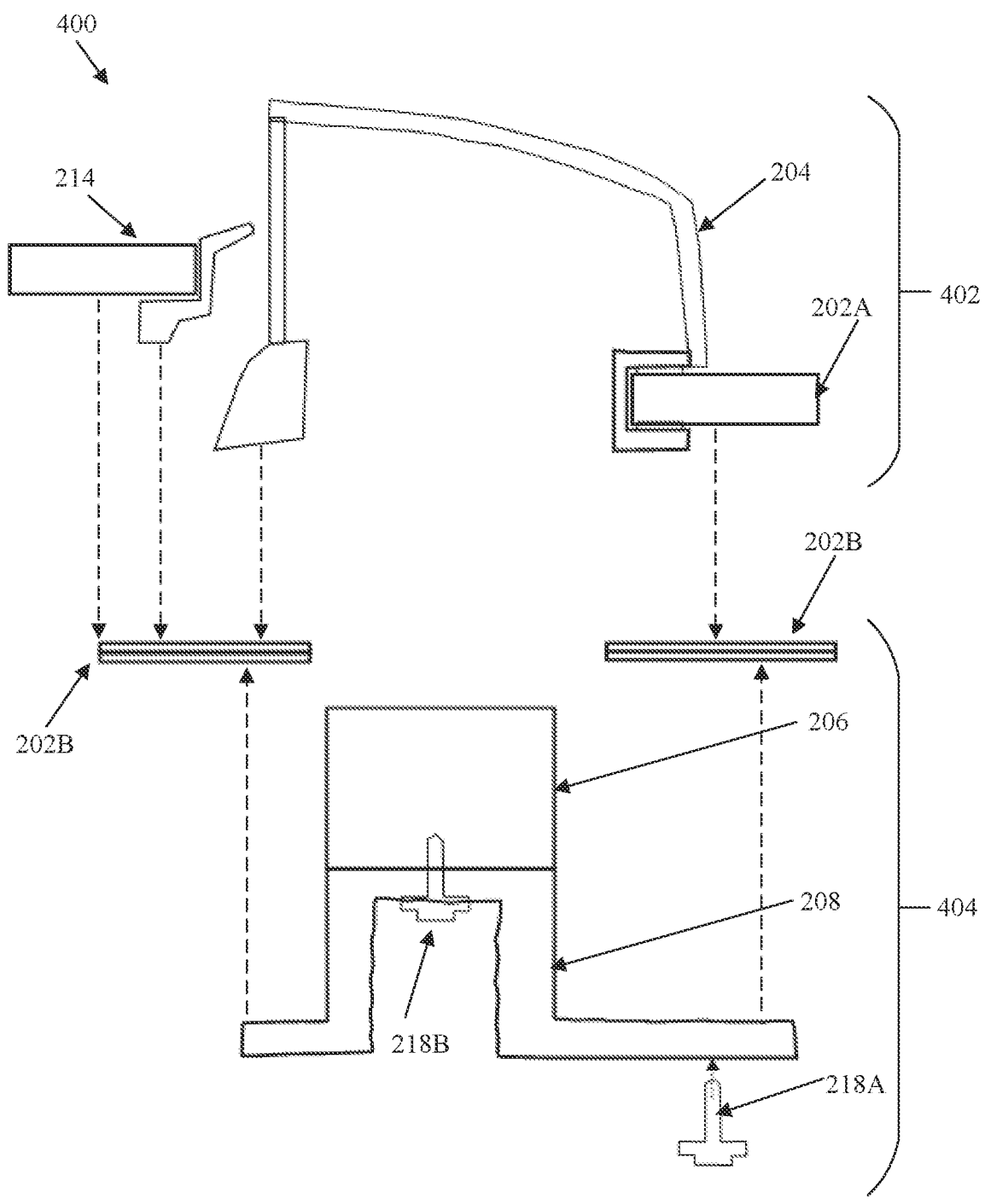
FIG. 4 is a diagram that illustrates an exemplary scenario to mount a sensor in the sensor mounting assembly of FIG. 1, in accordance with an embodiment of the disclosure.

The end portion 204A may include a suitable design, shape, and structure, which may be configured to form an integral substructure (for example, a foundation) for the cover 204. For example, the end portion 204A may form a flange (as shown in FIG. 2, FIG. 3, and FIG. 4), which may be configured to be coupled with the glass roof 202A and form the integral substructure for the cover 204. Details of the flange of the end portion 204A is further described, for example, in FIG. 3.

In an embodiment, the end portion 204A may be formed on a rear end of the sensor mounting assembly 100. In another embodiment, the end portion 204A may be formed on a front end of the sensor mounting assembly 100. In yet another embodiment, the end portion 204A may be formed on both the front end and the rear end of the sensor mounting assembly 100. The end portion 204A may have a substantially C-shaped structure, as shown in FIG. 2 and FIG. 3. However, the end portion 204A may have any other structure, such as, but not limited to, a V-shaped structure, a H-shaped structure, a U-shaped structure, and the like. In an embodiment, the end portion 204A may be integrally connected with the arcuate portion 204B.

The arcuate portion 204B may include a suitable design, shape, and structure, which may be configured to form an integral superstructure (for example, a ceiling garnish) for the cover 204. For example, the arcuate portion 204B may include a curved section (as shown in FIG. 2, FIG. 3, and FIG. 4), which may be configured to be integrally connected with the end portion 204A, to form the superstructure for the cover 204. Details of the arcuate portion 204B is further described, for example, in FIG. 3.

In an embodiment, the arcuate portion 204B may span from the front end of the sensor mounting assembly 100 to the rear end of the sensor mounting assembly 100. In another embodiment, the arcuate portion 204B may span from the front end of the sensor mounting assembly 100 till a specific portion of the sensor mounting assembly 100. In yet another embodiment, the arcuate portion 204B may span from the rear end of the sensor mounting assembly 100 till a specific portion of the sensor mounting assembly 100. The arcuate portion 204B may have a substantially curved structure, as shown in FIG. 2 and FIG. 3. However, the arcuate portion 204B may have any other structure, such as, but not limited to, an inverted U-shaped structure, M-shaped structure, and the like. In an embodiment, the arcuate portion 204B may be integrally coupled to a viewing window 204C associated with the sensor mounting assembly 100, and an end segment 204D associated with the viewing window 204C.

The viewing window 204C may be configured to provide a panoramic view 212 (for example, a 360-degree field-of-view) for the sensor 206 in the sensor mounting assembly 100. In an example, the viewing window 204C may be disposed at the proximal end of the arcuate portion 204B and facilitates the panoramic view 212 for the sensor 206. In an embodiment, the viewing window 204C may be formed from a transparent material (such as, a glass material, a quartz material, a sapphire material, and the like). In another embodiment, the viewing window 204C may be tinted based on the user preference. For example, the viewing window 204C may be tinted at a specific color, which may be analogous to a color of a painted coating on a surface of the vehicle 102. Such specialized tinting of the viewing window 204C may improve aesthetics of the vehicle 102.

In an embodiment, the viewing window 204C may be include the end segment 204D, which may be configured to be secured to a portion of the vehicle 102. For example, the end segment 204D may form a seal against the portion of the vehicle 102 and protect the sensor 206 against the ingress of fluids (such as, via the rainfall or other liquids) and the ingress of dust particles from the surrounding environment of the vehicle 102. In another example, the viewing window 204C may be coupled to a portion of the cover 204 and may form a secondary seal to protect the sensor 206 against the ingress of fluids (such as, via the rainfall or other liquids) and the ingress of dust particles from the surrounding environment of the vehicle 102.

In an embodiment, the end segment 204D of the arcuate portion 204B may be shown as a block in FIG. 2. However, the end segment 204D of the arcuate portion 204B may have any structural profile, such as, a rod, a sphere, or any other polygonal shape, based on user requirements and a level of sealing that may be required for the sensor 206 in the sensor mounting assembly 100.

The sensor 206 may include a suitable circuitry, logic, and network interfaces, which may be secured to a portion of the bracket 208 and configured to capture an image or a plurality of images of one or more objects in the surrounding environment of the vehicle 102. In an embodiment, the sensor 206 may include a 360-degree camera, which may be configured to capture a 360-degree view of the surrounding environment of the vehicle 102. In an embodiment, the 360-degree camera may be a single 360-degree camera (for example, a LiDAR sensor), which may be configured to capture the 360-degree view of the surrounding environment of the vehicle 102.

In another embodiment, the sensor 206 may include a plurality of image sensors (not shown) to capture the 360-degree view of the surrounding environment of the vehicle 102. Each image sensor of the plurality image sensors may be configured to capture a portion of the 360-degree view of the surrounding environment of the vehicle 102. In an embodiment, the sensor 206 (i.e., the 360-degree camera) may be configured to stitch each captured portion of the plurality image sensors to generate the 360-degree view of the surrounding environment of the vehicle 102.

The sensor 206 (such as, the 360-degree camera) may be disposed on the bracket 208 and installed within the sensor mounting assembly 100. Examples of the 360-degree camera may include, but are not limited to, the LiDAR sensor, an omnidirectional camera, a panoramic camera, a charge coupled device (CCD) sensor, a complementary metal oxide semiconductor (CMOS) sensor, a RADAR sensor, an infrared sensor, an image sensor, a wide-angle camera, an action camera, a camcorder, a camera with an integrated depth sensor, a cinematic camera, Digital Single-Lens Reflex (DSLR) camera, a Digital Single-Lens Mirrorless (DSLM) camera, a digital camera, camera phones, a time-of-flight camera (ToF camera), a night-vision camera, and/or other image capturing or devices with 360-degree view capturing capability.

In a preferred embodiment, the sensor 206 may be the LiDAR sensor that has a horizontal field-of-view (for example, the panoramic view 212 of the sensor 206 along a horizontal plane) between 1-360 degrees and further has a vertical field-of-view (for example, the panoramic view 212 of the sensor 206 along a vertical plane) between 1-45 degrees. In an embodiment, the cover 204 may have the viewing window 204C that may be configured to allow at least one of: the horizontal field-of-view and the vertical field-of-view for the sensor 206. In another embodiment, the viewing window 204C may be configured to allow a combination of the horizontal field-of-view and the vertical field-of-view for the sensor 206.

The LiDAR sensor may perform a 360-degrees scan of the surrounding environment to identify a target object. For example, the target object may be identified—based on an emission of a laser illumination on the target object and a time taken to receive a reflected laser illumination from the target object. As the sensor 206 is sealed on the proximal end (such as, via the end segment 204D) of the arcuate portion 204B and the distal end (such as, via the end portion 204A) of the arcuate portion 204B from the surrounding environment (such as, the rainfall, dust, and the like), there may be a substantial reduction in service events of the sensor 206, which may substantially save service costs of the sensor 206 that may be disposed on the bracket 208.

The bracket 208 may include a suitable design, shape, and structure, which may be configured to be coupled to the roof rail 202B that may be located beneath the glass roof 202A of the vehicle 102. In an embodiment, the bracket 208 may be configured to be secured to the roof rail 202B from the interior cabin 202C of the vehicle 102 and hold the sensor 206 proximate to the glass roof 202A of the vehicle 102. In an example, the bracket 208 may have a substantially square wave profile. The substantially square wave profile of the bracket 208 may have a trough portion 208A and a crest portion 208B. The trough portion 208A may be configured to be secured to the roof rail 202B from the interior cabin 202C of the vehicle 102. The crest portion 208B may have an inverted U-shaped structure and configured to hold the sensor 206 proximate to the glass roof 202A of the vehicle 102. In an embodiment, the trough portion 208A may have a first height, which may be lesser than a second height of the crest portion 208B. In another embodiment, the trough portion 208A may be integrally connected with the crest portion 208B to form the bracket 208. In yet another embodiment, the trough portion 208A and the crest portion 208B may be formed from a same material and manufactured as a unitary element.

In an embodiment, the bracket 208 may be positioned from the interior cabin 202C of the vehicle, to adjust the sensor 206 to be proximate to the glass roof 202A of the vehicle 102. As the bracket 208 and the sensor 206 is configured to be secured to the roof rail 202B from the interior cabin 202C of the vehicle 102, there may not be a need for the operator to climb on to the roof of the vehicle 102 for positioning and assembling the sensor 206. Hence, it may be further easier for the operator to perform precise positioning and assembly of the sensor 206 on the roof of the vehicle 102, which may further improve ergonomics in the assembly line of the vehicle 102.

The vehicle 102 may also include a front windshield 214. The front windshield 214 may be a transparent screen, which may be configured to be formed from a laminated safety glass that may protect the occupants and/or the operator of the vehicle 102 from wind, dust, and any debris that may be received from the surrounding environment of the vehicle 102. The front windshield 214 may also provide a structural support to the vehicle 102. It may be noted that the front windshield 214 shown in FIG. 2 is presented merely as an example of a generic windshield and further description of the front windshield 214 has been omitted from the disclosure for the sake of brevity.

In an embodiment, the front windshield 214 of the vehicle may be secured to a first surface 216A (such as a specific area/portion) of the roof rail 202B and the bracket 208 may be secured to a second surface 216B (such as another specific area/portion) of the roof rail 202B. In an example, the second surface 216B may be located opposite to the first surface 216A of the roof rail 202B. In another example, the second surface 216B may be a surface located in the interior cabin 202C of the vehicle 102. Therefore, as the operator shall directly secure the bracket 208 to the second surface 216B that shall be accessed from the interior cabin 202C of the vehicle 102, there may not be a requirement for the operator to climb on to the roof of the vehicle 102 and thus, further improve ergonomics in the assembly line of the vehicle 102.

In another embodiment, to facilitate an optimal sealing between the cover 204 and the bracket 208, the viewing window 204C may be coupled to a portion of the cover 204. For example, the viewing window 204C of the arcuate portion 204B has the end segment 204D, which may be secured to the portion of the front windshield 214 of the vehicle 102. For example, the optimal sealing between the end segment 204D and the front windshield 214, with the roof rail 202B, may protect the sensor 206 against the ingress of fluids (such as, via the rainfall or other liquids) and the ingress of dust particles from the surrounding environment of the vehicle 102. In another example, the optimal sealing between the viewing window 204C and the arcuate portion 204B may protect the sensor 206 against the ingress of fluids (such as, via the rainfall or other liquids) and the ingress of dust particles from the surrounding environment of the vehicle 102. In yet another example, the optimal sealing between the end portion 204A and the glass roof 202A of the vehicle 102, may protect the sensor 206 against the ingress of fluids (such as, via the rainfall or other liquids) and the ingress of dust particles from the surrounding environment of the vehicle 102. In yet another example, the optimal sealing between the end portion 204A and the glass roof 202A and the roof rail 202B of the vehicle 102, may protect the sensor 206 against the ingress of fluids (such as, via the rainfall or other liquids) and the ingress of dust particles from the surrounding environment of the vehicle 102.

In an embodiment, the trough portion 208A is secured, via a first fastener 218A, to the roof rail 202B from the interior cabin 202C of the vehicle 102 and the crest portion 208B is secured, via a second fastener 218B, to the sensor 206 from the interior cabin 202C of the vehicle 102. In the service event, the first fastener 218A and the second fastener 218B may be selectively unfastened to repair/remove the sensor 206 from the interior cabin 202C of the vehicle 102. Therefore, there may not be a need for the operator to climb on to the roof of the vehicle 102 and further this may improve the ergonomics in the assembly line of the vehicle 102. Details on the service event is further explained, for example, in FIG. 4.

In operation with respect to FIG. 2, the sensor mounting assembly 100 to hold the sensor 206 is shown. The sensor mounting assembly 100 may include the cover 204 that may be coupled to the glass roof 202A of the vehicle 102. Such coupling between the cover 204 and glass roof 202A may facilitate precise positioning and assembly of the sensor 206 and improve ergonomics in the assembly line of the vehicle 102.

The sensor mounting assembly 100 may further include the bracket 208 that may be coupled to the roof rail 202B that may be located beneath the glass roof 202A of the vehicle 102. The bracket 208 may be configured to be secured to the roof rail 202B from the interior cabin 202C of the vehicle 102, to hold the sensor 206 proximate to the glass roof 202A of the vehicle 102. As the bracket 208 and the sensor 206 is configured to be secured to the roof rail 202B from the interior cabin 202C of the vehicle 102, there may not be a need for the operator to climb on to the roof of the vehicle 102 for positioning and assembling the sensor 206. Hence, it may be further easier for the operator to perform precise positioning and assembly of the sensor 206 on the roof of the vehicle 102, which may further improve ergonomics in the assembly line of the vehicle 102.

Further, it may also be noted that the bracket 208 may also be selectively removable (for example, selectively unfastened) from the roof rail 202B in the service event (for example, the repair/replacement) of the sensor 206. Hence, as the sensor 206 may be accessed directly from the interior cabin 202C of the vehicle 102, there may be a substantial timesaving in the service event of the sensor 206.

FIG. 3 is a diagram that illustrates a second cross-sectional view of the sensor mounting assembly of FIG. 1, in accordance with an embodiment of the disclosure. FIG. 3 is explained in conjunction with elements from FIG. 1 and FIG. 2. With reference to FIG. 3, there is shown a second cross-sectional view 300 of the sensor mounting assembly 100 and the vehicle 102, which may be sectioned along the second section B-B, as shown in FIG. 1.

Referring to FIG. 3, there is shown the glass roof 202A of the vehicle 102 that has an opening 302 to receive the sensor mounting assembly 100 (shown in FIG. 2). The end portion 204A of the cover 204 may form a flange 304 to couple with edges of the opening 302 of the glass roof 202A. The flange 304 may be coupled with edges of the opening of the glass roof 202A, via an adhesive material 306. In an embodiment, the adhesive material 306 may be disposed between the flange 304 and the glass roof 202A.

The opening 302 of the glass roof 202A may be formed based on a mechanical material removal process (for example, a milling process, a drilling process, a blanking process, a sawing process, and the like). In an example, the opening 302 may be formed, such that, a diameter of the opening 302 may be substantially same as a diameter of the sensor mounting assembly 100. In such instances, the flange 304 of the end portion 204A of the sensor mounting assembly 100 may form an interference fit with the opening 302 of the glass roof 202A of the vehicle 102.

The flange 304 may include a suitable design, shape, or structure, which may be configured to couple the sensor mounting assembly 100 with the glass roof 202A of the vehicle 102. For example, the flange 304 may form a C-shaped structure (such as, a circumferential collar) against the glass roof 202A, such that, the end portion 204A of the sensor mounting assembly 100 may form an optimal sealing with the glass roof 202A of the vehicle 102. The circumferential collar shown in FIG. 3 is merely an example of the flange 304, and the flange 304 may have any other structural profile based on a structural profile of the opening 302 of the glass roof 202A and corresponding user requirements.

The adhesive material 306 may be disposed between the flange 304 and edges of the opening 302 of the glass roof 202A, such that, the adhesive material 306 facilitates a seal fit between the flange 304 of the sensor mounting assembly 100 and the opening 302 of the glass roof 202A. In an example, the adhesive material 306 may include, but not limited to, a wet adhesive material, a contact adhesive material, a reactive adhesive material, a hot-melt adhesive material, a pressure-sensitive adhesive material, and the like.

Based on user requirements, the operator may select a suitable adhesive material (i.e., the adhesive material 306) and dispose between the flange 304 and the edges of the opening 302 of the glass roof 202A, to ensure the seal fit between the flange 304 of the sensor mounting assembly 100 and the opening 302 of the glass roof 202A.

In an embodiment, the crest portion 208B of the bracket 208 (shown in FIG. 2) may be spaced from the cover 204 at a first distance 308. In some instances, the first distance 308 may determine a field of view (i.e., the panoramic view 212) for the sensor 206. For example, in case the first distance 308 is more than a standard distance, there may be an improved field of view compared to a standard field of view of the sensor 206. In another example, in case the first distance 308 is less than a standard distance, there may be a reduced field of view compared to the standard field of view of the sensor 206.

In another embodiment, the glass roof 202A may be located at a first datum level 310A, and the sensor 206 may have a base (not shown) that may be located at a second datum level 310B. In certain instances, the second datum level 310B may be located higher than the first datum level 310A. Such arrangement of datum levels (i.e., the first datum level 310A below the second datum level 310B) may ensure an optimal field of view (i.e., the panoramic view 212) for the sensor 206, without any interference from the surrounding environment.

In operation, the end portion 204A may form the flange 304 that may be configured to couple with the edges of the opening 302 to generate a flushed configuration with the glass roof 202A and to form the storage cavity 210 within the cover 204. The cover 204 may enclose the sensor 206, via the storage cavity 210. In an embodiment, the flange 304 may be coupled with the edges of the opening 302, via the adhesive material 306, to form the flushed configuration with the glass roof 202A. In an example, the flange 304 may be configured to couple with each edge of the edges of the opening 302, via a heat activated adhesive material (i.e., the adhesive material 306), to form the flushed configuration. In another example, the flange 304 may be configured to couple only with specific edge of the edges of the opening 302, via the adhesive material 306, to form the flushed configuration. Such flushed configuration of the flange 304 may facilitate an improved aesthetics and aerodynamics of the vehicle 102.

In an embodiment, the flange 304 may include the C-shaped structure that may be configured to couple with a first edge (not shown) and a second edge (not shown) of the opening 302 via the heat activated adhesive material (i.e., the adhesive material 306), to form the flushed configuration. The flushed configuration may indicate that a flange datum level (not shown) of the flange 304 is same as a glass roof datum level (not shown) of the glass roof 202A. Such similarity in datum level of the flange 304 and the glass roof 202A may facilitate an improved field-of-view for the sensor 206 in the sensor mounting assembly 100.

In yet another embodiment, the sensor 206 may be inserted within the opening 302 to reach the storage cavity 210 such that a base of the sensor 206 may be located proximate to the glass roof 202A of the vehicle 102. For example, the sensor 206 may be inserted within the opening 302 of the glass roof 202A, via the interior cabin 202C of the vehicle 102. As the bracket 208 and the sensor 206 is configured to be secured to the opening 302 of the glass roof 202A, via the interior cabin 202C of the vehicle 102, there may not be a need for the operator to climb on to the roof of the vehicle 102 for positioning and assembling the sensor 206. Hence, it may be further easier for the operator to perform precise positioning and assembly of the sensor 206 on the roof of the vehicle 102, which may further improve ergonomics in the assembly line of the vehicle 102.

FIG. 4 is a diagram that illustrates an exemplary scenario to mount a sensor in the sensor mounting assembly of FIG. 1, in accordance with an embodiment of the disclosure. FIG. 4 is explained in conjunction with elements from FIG. 1, FIG. 2 and FIG. 3. With reference to FIG. 4, there is shown an exemplary scenario 400 to mount the sensor 206 in the sensor mounting assembly 100. In the exemplary scenario 400, there is shown a first assembled component 402 and a second assembled component 404.

The first assembled component 402 may include the cover 204 that may be pre-assembled with the glass roof 202A of the vehicle 102. For example, a glass roof manufacturer (not shown) may pre-assemble the cover 204 with the glass roof 202A, to form the first assembled component 402. Such pre-assembly before reaching the assembly line, may substantially save a cycle time (i.e., a time required to assemble all components of the sensor mounting assembly 100) in the assembly line of the vehicle 102. When the first assembled component 402 reaches the assembly line, the first assembled component 402 may be coupled to the front windshield 214, to ensure optimal sealing of the sensor 206 of the sensor mounting assembly 100.

The second assembled component 404 may include the sensor 206 that may be secured and held on to the bracket 208, which may be coupled to the roof rail 202B of the vehicle 102. In an example, the operator of the assembly line may secure the sensor 206 to the crest portion 208B (shown in FIG. 3) of the bracket 208, via the second fastener 218B. Based on securing the sensor 206 with the bracket 208, the operator may then secure the trough portion 208A (shown in FIG. 2) of the bracket 208 with the roof rail 202B, via the first fastener 218A, to form the second assembled component 404.

In operation, the sensor 206 may be mounted on to the vehicle 102, via a rapid mounting event. In the rapid mounting event, the second assembled component 404 may be coupled to the first assembled component 402, via a portion of a front windshield 214. In such coupling process, the operator may easily position the sensor 206 directly from the interior cabin 202C (shown in FIG. 1C) of the vehicle 102 and may not be required to climb on the roof of the vehicle 102 to mount the sensor 206. Therefore, there may be a substantial improvement in the ergonomics of the assembly line of the vehicle 102. Once the sensor 206 is mounted, the sensor 206 may also be easily serviced/repaired/replaced from the vehicle 102, as described below.

Based on a completion of a certain duration, the sensor 206 may tend to show abnormal signals, which may indicate a requirement of a service event for the sensor 206. Such abnormal signals may be generated based on multiple parameters, such as, a service life of the sensor 206, a wear and tear of the sensor 206, and the like. Therefore, once the certain duration is completed after installation of the sensor 206, the operator may perform a service event for the sensor 206.

In the service event, the bracket 208 may be released/removed from the roof rail 202B. For example, the first fastener 218A that couples the bracket 208 and the roof rail 202B may be released/removed from the roof rail 202B. Based on the release/removal of the first fastener 218A, the operator may remove the second fastener 218B that couples the bracket 208 and the sensor 206, to perform the service event (for example, replacement of the sensor 206 or the repair of the sensor 206) on the sensor 206. Based on a completion of the service event of the sensor 206, the operator may secure the sensor 206 with the crest portion 208B (shown in FIG. 3) of the bracket 208, via the second fastener 218B. Based on securing the sensor 206 with the crest portion 208B of the bracket 208, the operator may then couple the bracket 208 to the roof rail 202B, via the first fastener 218A, to facilitate an optimal sealing provision for the sensor 206. Such optimal sealing of the sensor mounting assembly 100 after the service event, may protect the sensor 206 against the ingress of fluids (such as, via the rainfall or other liquids) and the ingress of dust particles from the surrounding environment of the vehicle 102, and may improve a service life of the sensor 206.

Figure 5:
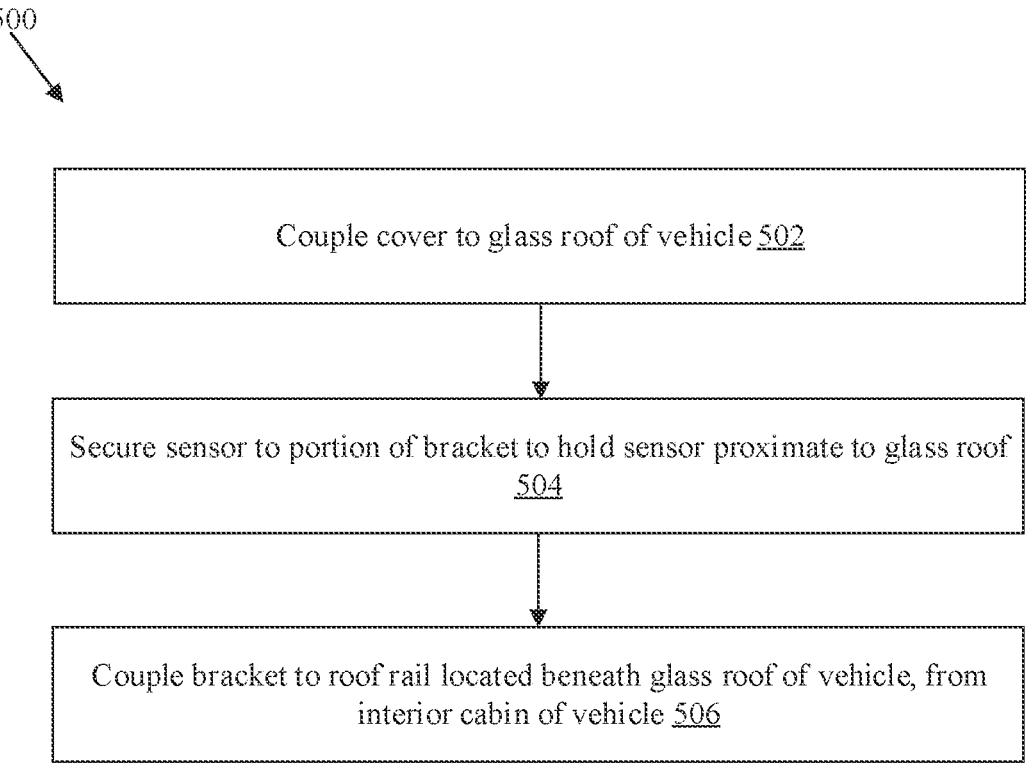
FIG. 5 is a flowchart that illustrates exemplary operations for forming a sensor mounting assembly, in accordance with an embodiment of the disclosure.

FIG. 5 is a flowchart that illustrates exemplary operations for forming a sensor mounting assembly, in accordance with an embodiment of the disclosure. FIG. 5 is explained in conjunction with elements from FIG. 1, FIG. 2, FIG. 3, and FIG. 4. With reference to FIG. 5, there is shown a flowchart 500. The operations from 402 to 406 may be implemented, for example, by the sensor mounting assembly 100 or an operator associated with the sensor mounting assembly 100. The operations of the flowchart 500 may start at 402.

At 502, the cover 204 may be coupled to the glass roof 202A of the vehicle 102. In an embodiment, the sensor mounting assembly 100 or the operator may couple the cover 204 to the glass roof 202A of the vehicle 102, as described further, for example, in FIG. 1, FIG. 2, and FIG. 3.

At 504, the sensor 206 may be secured to the portion of the bracket 208, to hold the sensor 206 proximate to the glass roof 202A of the vehicle 102. In an embodiment, the sensor mounting assembly 100 or the operator may secure the sensor 206 to the portion of the bracket 208, to hold the sensor 206 proximate to the glass roof 202A of the vehicle 102, as described further, for example, in FIG. 1, FIG. 2, and FIG. 3.

At 506, the bracket 208 may be coupled to the roof rail 202B located beneath the glass roof 202A of the vehicle 102, from the interior cabin 202C of the vehicle 102. In an embodiment, the sensor mounting assembly 100 or the operator may couple the bracket 208 to the roof rail 202B located beneath the glass roof 202A of the vehicle 102, from the interior cabin 202C of the vehicle 102, as described further, for example, in FIG. 1, FIG. 2 and FIG. 3.

The flowchart shown in FIG. 5 is illustrated as discrete operations, such as from 502 to 506, which relates to the method of forming the sensor mounting assembly 100. However, in certain embodiments, such discrete operations may be further divided into additional operations, combined into fewer operations, or eliminated, depending on the implementation without detracting from the essence of the disclosed embodiments.

For the purposes of the present disclosure, expressions, such as "including", "comprising", "incorporating", "consisting of", "have", "is", used to describe and claim the present disclosure, are intended to be construed in a non-exclusive manner, namely allowing for items, components or elements not explicitly described also to be present. Reference to the singular is also to be construed to relate to the plural. Further, all joinder references (e.g., attached, coupled, connected, o the like) are used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A sensor mounting assembly, comprising:
  a cover coupled to a glass roof of a vehicle, wherein the cover is configured to enclose a sensor that is disposed proximate to the glass roof of the vehicle; and
  a bracket coupled to a roof rail that is located beneath the glass roof of the vehicle, wherein the bracket is configured to be secured to the roof rail from an interior cabin of the vehicle, to hold the sensor proximate to the glass roof of the vehicle;
  wherein the glass roof has an opening; and
  wherein the cover has an end portion that forms a flange, wherein the flange is configured to couple with edges of the opening to form a storage cavity within the cover, the cover is configured to enclose the sensor, via the storage cavity.

2. The sensor mounting assembly according to claim 1, wherein,
  the flange is configured to couple with each edge of the edges of the opening, via a heat activated adhesive material.

3. The sensor mounting assembly according to claim 1, wherein,
  the flange has a C-shaped structure, which is configured to couple with a first edge and a second edge of the opening, via a heat activated adhesive material.

4. The sensor mounting assembly according to claim 1, wherein,
  the sensor is inserted within the opening to reach the storage cavity such that a base of the sensor is proximate to the glass roof of the vehicle.

5. The sensor mounting assembly according to claim 1, wherein the sensor is a LiDAR sensor that has a horizontal field of view between 1-360 degrees and a vertical field of view between 1-45 degrees.

6. The sensor mounting assembly according to claim 5, wherein the cover has a viewing window to allow at least one of: the horizontal field of view and the vertical field of view for the sensor.

7. The sensor mounting assembly according to claim 6, wherein the viewing window is coupled to a portion of the cover.

8. The sensor mounting assembly according to claim 6, wherein the viewing window has an end segment, which is secured to a portion of a front windshield of the vehicle.

9. The sensor mounting assembly according to claim 8, wherein the front windshield of the vehicle is secured to a first surface of the roof rail and the bracket is secured to a second surface of the roof rail, the second surface is opposite to the first surface.

10. The sensor mounting assembly according to claim 1, wherein the bracket has a trough portion and a crest portion, wherein,
  the trough portion is configured to be coupled to the roof rail, and
  the crest portion is configured to hold the sensor proximate to the glass roof of the vehicle.

11. The sensor mounting assembly according to claim 10, wherein the trough portion is secured, via a first fastener, to the roof rail from the interior cabin of the vehicle.

12. The sensor mounting assembly according to claim 10, wherein the crest portion is secured, via a second fastener, to the sensor from the interior cabin of the vehicle.

13. The sensor mounting assembly according to claim 10, wherein the crest portion of the bracket is spaced from the cover at a first distance, and wherein the first distance determines a field of view for the sensor.

14. The sensor mounting assembly according to claim 1, wherein the cover is pre-assembled with the glass roof to form a first assembled component, and the bracket is assembled with the roof rail to form a second assembled component, and wherein the second assembled component is coupled to the first assembled component, via a portion of a front windshield.

15. A sensor mounting assembly, comprising:
  a cover coupled to a glass roof of a vehicle, wherein the cover is configured to enclose a sensor that is disposed proximate to the glass roof of the vehicle; and
  a bracket coupled to a roof rail that is located beneath the glass roof of the vehicle, wherein the bracket is configured to be secured to the roof rail from an interior cabin of the vehicle, to hold the sensor proximate to the glass roof of the vehicle, wherein
  the cover is pre-assembled with the glass roof to form a first assembled component, and the bracket is assembled with the roof rail to form a second assembled component, the second assembled component is coupled with the first assembled component to mount the sensor proximate to the glass roof of the vehicle;
  wherein the glass roof has an opening; and
  wherein the cover has an end portion that forms a flange, wherein the flange is configured to couple with edges of the opening to form a storage cavity within the cover, the cover is configured to enclose the sensor, via the storage cavity.

16. The sensor mounting assembly according to claim 15, wherein the glass roof is located at a first datum level, and the sensor has a base located at a second datum level, the second datum level is higher than the first datum level.

17. The sensor mounting assembly according to claim 15, wherein,
  the flange is configured to couple with each edge of the edges of the opening, via a heat activated adhesive material.

* * * * *